United States Patent
Pasch

(10) Patent No.: US 6,688,213 B2
(45) Date of Patent: Feb. 10, 2004

(54) DEVICE FOR SUBJECTING DOUGH PIECES AND BAKING PRODUCTS TO A NUMBER OF DOUGH TREATMENTS

(75) Inventor: Lothar Pasch, Terborg (NL)

(73) Assignee: Johan Hendrik Bernard Kaak, Gaanderen (NL)

(*) Notice: Subject to any disclaimer, the term of this patent is extended or adjusted under 35 U.S.C. 154(b) by 0 days.

(21) Appl. No.: 09/733,189

(22) Filed: Dec. 8, 2000

(65) Prior Publication Data

US 2002/0071883 A1 Jun. 13, 2002

(51) Int. Cl.$^7$ .............................. A21B 1/24; A21C 13/02
(52) U.S. Cl. ............................ 99/339; 99/340; 99/352; 99/443 C; 99/440; 99/467; 99/483
(58) Field of Search ............................... 99/443 C, 470, 99/483, 339, 340, 352, 448, 467

(56) References Cited

U.S. PATENT DOCUMENTS

| | | | | |
|---|---|---|---|---|
| 3,526,325 A | * | 9/1970 | Temple | 214/16.4 |
| 4,711,164 A | * | 12/1987 | Mendoza | 99/339 |
| 5,109,758 A | * | 5/1992 | Voegtlin | 99/443 C |
| 5,123,336 A | * | 6/1992 | Konig | 99/355 |
| 5,409,097 A | * | 4/1995 | Hoegger | 198/463.2 |
| 5,875,705 A | * | 3/1999 | Knost | 99/443 C |

FOREIGN PATENT DOCUMENTS

| | | |
|---|---|---|
| DE | 964762 | 5/1957 |
| DE | 1532965 | 7/1970 |
| DE | 2536102 | 3/1976 |
| EP | 0011061 | 5/1980 |
| EP | 1059034 A1 * | 12/2000 |
| FR | 2223945 | 10/1974 |
| FR | 2740299 | 4/1997 |
| GB | 250128 | 4/1926 |
| GB | 985054 | 3/1965 |
| NL | 18076 | 11/1927 |
| NL | 261293 | 5/1964 |
| RU | 2013958 C1 * | 6/1994 |
| WO | WO 98/12926 * | 4/1998 |
| WO | WO 99/37564 * | 7/1999 |

* cited by examiner

*Primary Examiner*—Drew Becker
(74) *Attorney, Agent, or Firm*—Thomas, Kayden, Horstemeyer & Risley

(57) ABSTRACT

Device for subjecting dough pieces to more than one dough treatment. The device has a number of dough treatment rooms placed above one another. From a supply side dough pieces are supplied to the device, and from a discharge side dough pieces that have been subjected to all dough treatments are discharged from the device. A first leverage apparatus is placed at the supply side and a second leverage apparatus is placed at the discharge side. Each dough treatment room is provided with an introduction opening for introducing dough pieces in the dough treatment room and with a take-out opening for taking dough pieces out of it. A conveyor conveys the dough pieces from the introduction opening to the take-out opening. The introduction opening and the take-out opening of each of the dough treatment rooms are placed near the respective supply side and the respective discharge side of the device.

5 Claims, 1 Drawing Sheet

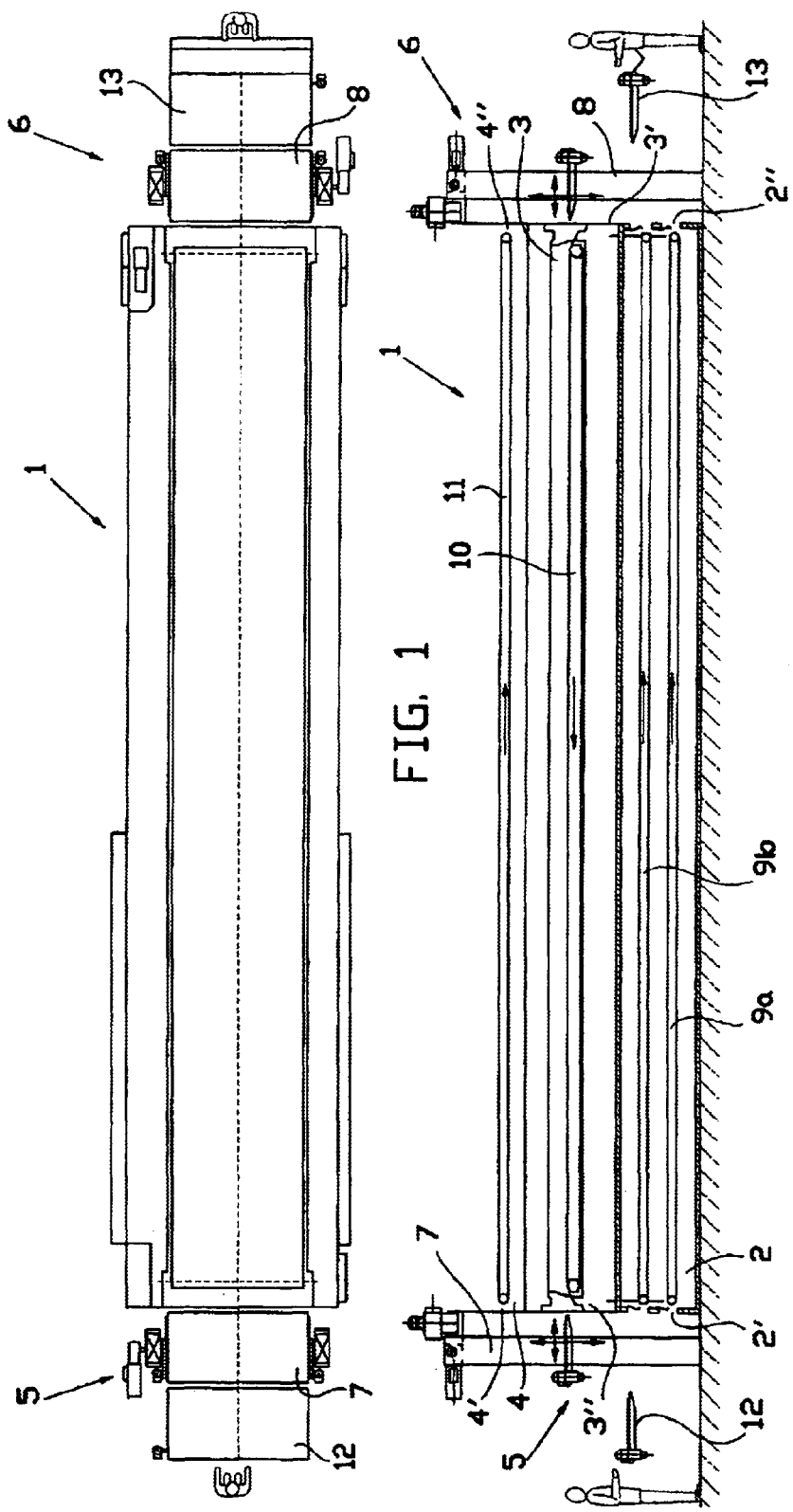

DEVICE FOR SUBJECTING DOUGH PIECES AND BAKING PRODUCTS TO A NUMBER OF DOUGH TREATMENTS

BACKGROUND OF THE INVENTION

The present invention relates to a device for subjecting dough pieces to more than one dough treatment.

Such devices have been known for a long time now. In them the various dough treatments, such as rising, baking and cooling, are carried out in separate dough treatment rooms that are spaced apart and connected to one another by means of for instance a conveyor belt. Such a device takes up quite a lot of room.

SUMMARY OF THE INVENTION

It is an objective of the present invention to provide a device for subjecting dough pieces to more than one dough treatment, which only takes up limited space.

To that end a device of the kind described above is characterized in that the device is provided with a number of dough treatment rooms placed above one another, a supply side from which dough pieces are supplied to the device, a discharge side from which dough pieces that have been subjected to all dough treatments are discharged from the device, a first leverage apparatus placed at the supply side of the device, and a second leverage apparatus placed at the discharge side of the device, each dough treatment room being provided with an introduction opening for introducing dough pieces in the dough treatment room, with a take-out opening for taking out dough pieces from the dough treatment room, and with a conveyor for conveying the dough pieces from the introduction opening to the take-out opening, and the introduction opening and the take-out opening of each of the dough treatment rooms being placed near the respective supply side and the respective discharge side of the device, so that the first leverage apparatus and the second leverage apparatus are able to bring the dough pieces to the introduction openings concerned and from the discharge openings concerned. Because the dough treatment rooms are placed above one another, and the first and the second leverage apparatus are able to bring the dough pieces to the respective introduction openings and from the respective take-out openings, a very compact device is obtained.

Moreover according to the device according to the invention the advantage is provided that only one discharger and one loader, for instance formed by the leverage apparatus or separate loading and discharging units which place dough pieces in the first leverage apparatus or take them from the second leverage apparatus, are needed for the entire device. This in contrast to the known device in which per dough treatment room one loader and discharger are needed, which renders the device according to the present application relatively cheap.

Some embodiments of the present invention will by way of example be described on the basis of the drawing, in which:

BRIEF DESCRIPTION OF THE DRAWINGS

FIG. 1 schematically shows a top view of a device according to the present device, and FIG. 2 schematically shows a side view of the device according to FIG. 1.

DETAILED DESCRIPTION OF THE PREFERRED EMBODIMENTS

In FIGS. 1 and 2 a top view and a side view, respectively, of a device 1 according to the present invention are schematically shown. The device 1 is used for subjecting dough pieces (not shown) to more than one dough treatment. The number of desired dough treatments can be chosen, and the present invention will by way of example be described on the basis of three dough treatments, namely rising, baking and cooling. It will be clear however, that any other combination of dough treatments in the device is possible. For instance it will be possible to let dough pieces rise in the device, and have the dough pieces baked into bread, after which the bread is transported to a separate cooling device. Furthermore the dough pieces can be placed separately in the dough treatment rooms or for instance in so called dough pans or dough couples. After baking the dough pieces into bread, the bread can be taken out of the dough pans or dough couples, for instance by tilting the dough pans or dough couples.

The device 1 contains three dough treatment rooms 2, 3, 4 that are placed above one another. The rising of the dough pieces for instance takes place in the lowermost dough treatment room 2 shown In FIG. 2. In the dough treatment room 3 placed above it the baking of the risen dough pieces into bread takes place, and in the uppermost dough treatment room 4 the cooling of the dough pieces baked into bread takes place. It will be clear to an expert that amongst others because of the various temperature conditions under which the various dough treatments have to be carried out, the dough treatment rooms are isolated one from the other. Furthermore the invention is not limited to the order of placement of the dough treatment rooms as shown in the figures, but for instance the baking treatment room could be the uppermost or lowermost dough treatment room, as a result of which also the other dough treatment rooms could vary in place.

Each dough treatment room 2, 3, 4 has an introduction opening 2', 3', 4' for introducing dough pieces in the dough treatment room 2, 3, 4, and a take-out opening 2", 3", 4" for taking out dough pieces from the dough treatment room 2, 3, 4. Each dough treatment room also has a conveyor 9a, 9b; 10; 11 for conveying the dough pieces from the introduction opening 2', 3', 4' to the take-out opening 2", 3", 4". The conveyor 9a, 9b here is designed double for the rising treatment. In FIG. 2 an example of the transport directions in the dough treatment room in question is indicated by arrows.

The device 1 has a supply side 5 from which dough pieces are supplied to the device 1, and a discharge side from which dough pieces that have been subjected to all dough treatments are discharged from the device 1. Furthermore a first leverage apparatus 7 is placed at the supply side 5 of the device 1, and a second leverage apparatus 8 is placed at the discharge side 6 of the device 1.

The introduction opening 2', 3', 4' and the take-out opening 2", 3", 4" of each of the dough treatment rooms 2, 3, 4 are placed near a respective supply side 5 and the discharge side of the device 1. As a result the first leverage apparatus 7 is able to introduce dough pieces in the introduction opening 2' of the rising treatment room 2. After going through said rising treatment room the second leverage apparatus 8 takes the dough pieces out of said rising treatment room 2 and the dough pieces are moved upwards and supplied to the introduction opening 3' of the baking room 3. After going through the baking room 3 the first leverage apparatus 7 takes the dough pieces that are baked into bread out of the discharge opening 3" and moves them to the introduction opening 4' of the cooling room 4. Finally the second leverage apparatus 8 takes the dough pieces baked into bread out of the discharge opening 4" of the cooling room, and the dough pieces baked into bread can be conveyed further for further treatment, such as wrapping.

It will be clear however that the conveyor devices as shown in FIG. 2 can be altered is desired. For instance the conveying direction of the conveyor 9a can be reversed, so that the supply side and the discharge side are formed by the same side, and the introduction opening and the discharge opening are formed by the same opening. Moreover the leverage apparatus now also function as discharger and loader of the device. Alternatively however, it is possible that a separate loader 12 and discharger 13 are present, which are used to supply the dough pieces to and discharge them from the leverage apparatus concerned. Depending on the capacity of the device the loader and discharger can for instance also be designed double.

Preferably the respective introduction openings 2', 3', 4' and discharge openings 2", 3", 4" are at least situated almost above one another, so that the leverage apparatus only need to make a vertical displacement movement. It is noted here that such leverage apparatus are known per se, and that such leverage apparatus have means to move the dough pieces laterally, for instance by a conveyor.

Further it should be understood that above only the measures and parts that are relevant to the invention have been discussed, and that for the sake of clarity elaborate descriptions of the dough treatments and the like have been left out, as these are known per se to the expert. For instance it is known to an expert to choose suitable conveyors for the dough treatment rooms concerned. Furthermore it is possible to carry out the various dough treatments in one dough treatment room, naturally when the conditions in a dough treatment room allow this. On the other hand a dough treatment could if so desired take place in several dough treatment rooms. Many different embodiments are therefore possible which are alternative forms of the embodiment described above, in which, however, according to the invention at least two different dough treatments have to take place in dough treatment rooms placed above each other.

What is claimed is:

1. Device (1) for subjecting dough pieces to more than one dough treatment in which the device (1) is provided with:
   a number of dough treatment rooms (2, 3, 4) placed above one another, each of the dough treatment rooms defining a volume for enclosing an atmosphere, wherein dough treatment rooms relating to different atmospheres are sealed from each other such that the volumes are not in direct fluid communication,
   a supply side (5) from which dough pieces are supplied to the device (1),
   a discharge side (6) from which dough pieces that have been subjected to all dough treatments are discharged from the device (1),
   a first leverage apparatus (7) placed at the supply side (5) of the device (1), and
   a second leverage apparatus (8) placed at the discharge side (6) of the device (1),
   each dough treatment room (2, 3, 4) being provided with an introduction opening (2', 3', 4') for introducing dough pieces in the dough treatment room (2, 3, 4), with a take-out opening (2", 3", 4") for taking out dough pieces from the dough treatment room (2, 3, 4) and with a conveyor (9a, 9b; 10; 11) for conveying the dough pieces from the introduction opening (2', 3', 4') to the take-out opening (2", 3", 4"), and
   the introduction opening (2', 3', 4') and the take-out opening (2", 3", 4") of each of the dough treatment rooms (2, 3, 4) being placed near the respective supply side (5) and the respective discharge side of the device (1), so that the first leverage apparatus (7) and the second leverage apparatus (8) are able to bring the dough pieces to the introduction openings concerned and from the discharge openings concerned.

2. Device (1) according to claim 1, in which the respective introduction openings (2', 3', 4') and take out openings (2", 3", 4") are situated above each other.

3. Device according to claim 1, in which the dough treatment rooms placed above one another are intended for rising and baking.

4. Device according to claim 1, comprising at least three dough treatment rooms placed above one another for rising, baking and cooling, respectively.

5. Device (1) according to claim 1 in which the conveyor (9a, 9b; 10; 11) in one of the dough treatment rooms (2, 3, 4) has a conveying direction opposite to that of the conveyor (9a, 9b; 10; 11) in another of the dough treatment rooms (2, 3, 4).

* * * * *